United States Patent [19]

Kawamura et al.

[11] Patent Number: 5,079,713
[45] Date of Patent: Jan. 7, 1992

[54] METHOD AND APPARATUS FOR PREVENTING TOOL COLLISON

[75] Inventors: Hideaki Kawamura, Hachioji; Atsushi Shima, Koganei; Teruyuki Matsumura, Hachioji, all of Japan

[73] Assignee: Fanuc Ltd., Minamitsuru, Japan

[21] Appl. No.: 634,801

[22] Filed: Jan. 10, 1991

Related U.S. Application Data

[63] Continuation of Ser. No. 423,544, Oct. 13, 1989, abandoned, filed as PCT/JP87/00127, Feb. 27, 1987, which is a continuation of Ser. No. 130,116, Oct. 26, 1987, abandoned.

[30] Foreign Application Priority Data

Feb. 27, 1986 [JP] Japan .................................. 61-042296

[51] Int. Cl.$^5$ ..................... G05B 19/405; B23Q 15/00; B23Q 11/00
[52] U.S. Cl. ................................. 364/474.2; 364/192; 364/184; 364/474.22
[58] Field of Search ........... 364/167.01, 474.2, 474.22, 364/474.26, 474.23, 184, 188-193; 82/2 B; 318/563, 565

[56] References Cited

U.S. PATENT DOCUMENTS

| 4,513,366 | 4/1985 | Munekata et al. | 364/192 |
| 4,558,419 | 12/1985 | Kanematsu et al. | 364/474 |
| 4,633,409 | 12/1986 | Sekikawa | 364/474 |
| 4,700,313 | 10/1987 | Takagawa | 364/474 |

FOREIGN PATENT DOCUMENTS 2117929 10/1983 United Kingdom ............... 364/191

Primary Examiner—Allen R. MacDonald
Attorney, Agent, or Firm—Staas & Halsey

[57] ABSTRACT

In numerically controlling a machine tool having a plurality of movable members controlled by respective programs, the programs are automatically altered to reliably avoid collision between the movable members. Labor and time required for the operator to alter the programs are reduced.

4 Claims, 6 Drawing Sheets

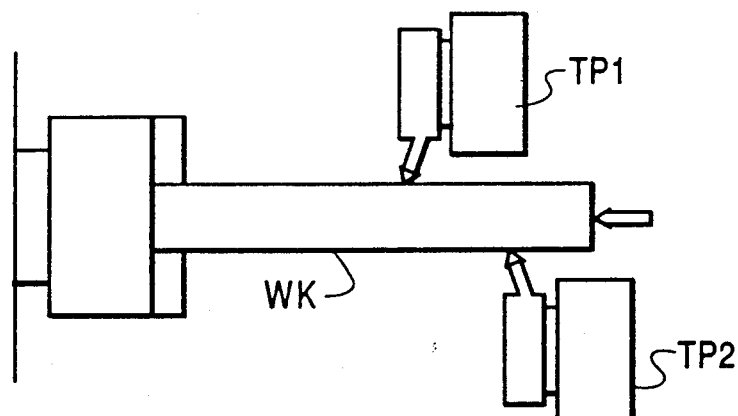
FIG. 2
| PROGRAM FOR TOOL REST 1 | PROGRAM FOR TOOL REST 2 |
|---|---|
| . | . |
| . | . |
| N100X --- Z --- ; | N200X --- Z --- ; |
| N101X --- Z --- ; | N201X --- Z --- ; |
| N102X --- Z --- ; | N202X --- Z --- ; |
| N103X --- Z --- ; | N203X --- Z --- ; |
| . | . |
FIG. 3(a)
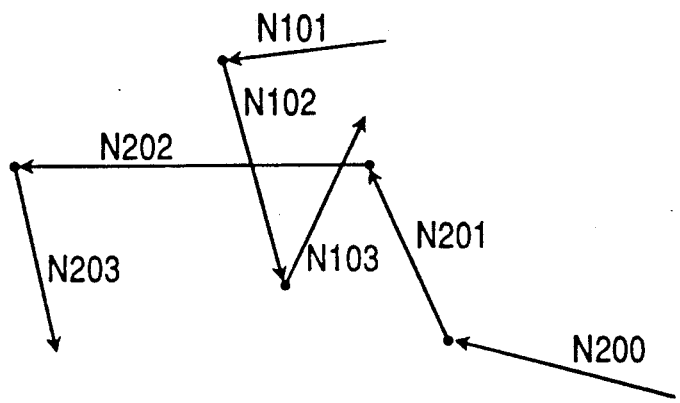
FIG. 3(b)

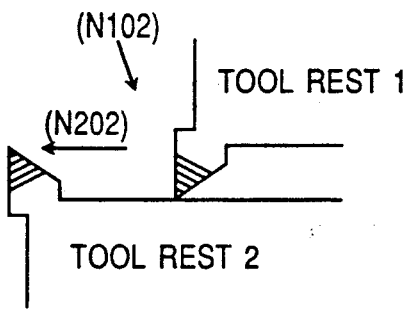

FIG. 4

| TYPES OF SYSTEM PARAMETERS | CONTENTS OF SYSTEM PARAMETERS |
|---|---|
| TOOL REST PRIORITY (INITIAL VALUE 0) | WHEN IT IS 0 : IT IS SET BY OPERATOR IN THE EVENT OF INTERFERENCE.<br>WHEN IT IS 1 : TOOL REST 1 HAS PRIORITY.<br>WHEN IT IS 2 : TOOL REST 2 HAS PRIORITY. |
| DWELLING M CODE (INITIAL VALUE 200) | PRESETTABLE IN RANGE FROM 100 TO 999 |
| REPETITIVE EXECUTION PARAMETER (INITITAL VALUE 0) | WHEN IT IS 0 : REPETITIVE AUTOMATIC COLLISION PREVENTION FUNCTION IS USED. ONCE INTERFERENCE OCCURS, DWELLING M CODE IS INSERTED AND PROGRAM IS EXECUTED AGAIN FROM ITS FIRST ADDRESS.<br><br>WHEN IT IS 1 : AUTOMATIC COLLISION PREVENTION FUNCTION IS USED ONCE. ONCE INTERFERENCE OCCURS, DWELLING M CODE IS INSERTED, PROGRAM IS REWOUND, AND FINISHED. |

FIG. 5

PROGRAM FOR TOOL REST 1          PROGRAM FOR TOOL REST 2
　　　•　　　　　　　　　　　　　　　　　•
　　　•　　　　　　　　　　　　　　　　　•
　　N101X --- Z --- ;　　　　　　　　N201X --- Z --- ;
　　N102X --- Z --- ;　　　　　　　　　　　M201 ;
　　　　　M201 ;　　　　　　　　　　N202X --- Z --- ;
　　N103X --- Z --- ;　　　　　　　　N203X --- Z --- ;
　　　•　　　　　　　　　　　　　　　　　•
　　　•　　　　　　　　　　　　　　　　　•

FIG. 7(a)

PROGRAM FOR TOOL REST 1          PROGRAM FOR TOOL REST 2
　　　•　　　　　　　　　　　　　　　　　•
　　　•　　　　　　　　　　　　　　　　　•
　　N101X --- Z --- ;　　　　　　　　N201X --- Z --- ;
　　　　　M201 ;　　　　　　　　　　N202X --- Z --- ;
　　N102X --- Z --- ;　　　　　　　　　　　M201 ;
　　N103X --- Z --- ;　　　　　　　　N203X --- Z --- ;
　　　•　　　　　　　　　　　　　　　　　•
　　　•　　　　　　　　　　　　　　　　　•

FIG. 7(b)

PROGRAM FOR TOOL REST 1              PROGRAM FOR TOOL REST 2
　　　•　　　　　　　　　　　　　　　　　•
　　　•　　　　　　　　　　　　　　　　　•
　　N101X --- Z --- ;　　　　　　　　　　N201X --- Z --- ;
　　N102X --- Z --- ;　　　　　　　　　　~~M201 ;~~   DELETE
　　　~~M201 ;~~  DELETE　　　　　　　　　M202 ;   INSERT
　　N103X --- Z --- ;　　　　　　　　　　N202X --- Z --- ;
　　　　　M202 ;  INSERT　　　　　　　　N203X --- Z --- ;
　　N104X --- Z --- ;　　　　　　　　　　N204X --- Z --- ;
　　　•　　　　　　　　　　　　　　　　　•
　　　•　　　　　　　　　　　　　　　　　•

FIG. 7(c)

```
PROGRAM FOR TOOL REST 1                PROGRAM FOR TOOL REST 2
        •                                      •
        •                                      •
   N100X --- Z --- ;                      N200X --- Z --- ;
   N101X --- Z --- ;                              M202 ;   INSERT
   N102X --- Z --- ;                      N201X --- Z --- ;
           ~~M201~~ ;   DELETE                    ~~M201~~ ;  DELETE
           M202 ;      INSERT             N202X --- Z --- ;
   N103X --- Z --- ;                      N203X --- Z --- ;
        •                                      •
        •                                      •
```

METHOD AND APPARATUS FOR PREVENTING TOOL COLLISON

This application is a continuation of application Ser. No. 07/423,544, filed Oct. 13, 1989, now abandoned, which is a continuation of U.S. Ser. No. 07/130,116 filed Oct. 26, 1987, now abandoned.

BACKGROUND OF THE INVENTION

The present invention relates to a method of and an apparatus for preventing tool collision to avoid interference between movable members such as a plurality of tool posts by automatically altering a machining program when such interference occurs.

Machine tools are numerically controlled for automatically machining workpieces. To machine a workpiece to a design drawing with a numerically controlled machine tool, numerical control commands in a prescribed format, i.e., a machining program, must be input to a numerical control apparatus.

A machining program for such a numerical control apparatus makes it possible to control a multi-axis for moving two tool posts, i.e., tool rests, independently to enable the two tool rests to cut the workpiece simultaneously. For example, a four-axis lathe shown in FIG. 4 has two tool rests TP1 and TP2 and moves the tool rests TP1 and TP2 independently along X- and Z- axes for machining a workpiece WK. By controlling the positions and paths of these tool rests TP1 and TP 2 according to a machining program comprising independent programs for the respective tool rests, the workpiece WK can be machined to a desired shape in a much shorter period of time than would be possible with an ordinary two-axis lathe.

Since, however, the single workpiece WK is simultaneously machined by the two tool rests TP1 and TP2, an accident may possibly occur due to interference between the tool rests TP1 and TP2. The machining programs for the respective tool rests should be of such a nature that they will prevent collision of the tool rests TP1 and TP2. To check such an interference, an actual machining process according to the machining programs to be checked is simulated on an animated screen. A tool interference checking process is effected by visually observing a simulation and determining that a collision or interference is caused when the paths of movement of the two tool rests intersect each other. The machining program includes a program for a tool rest 1 and a program for a tool rest 2 as shown in FIG. 3(a). Denoted in FIG. 3(a) at N100, N101, N102, N103, ... are data items for numerically controlling the movement of the tool rest 1, that is, blocks of a format of numerical control commands, and N200, N201, N202, N203, ... are blocks of a format of numerical control commands for numerically controlling the movement of the tool rest 2. FIG. 3(b) illustrates the paths of movement of the tool rests 1 and 2 displayed on the animated screen of a display unit during simulation of an actual machining effected by executing the tool rest programs. As shown in FIG. 3(b), the path of the tool rest 1 crosses the path of the tool rest 2 in the block N102 for the tool rest 1 and the block N202 for the tool rest 2. It can therefore be confirmed on the display screen that the tool rests 1 and 2 will actually collide with each other at the intersection of the tool rest paths, as shown in FIG. 4.

As described above, it has heretofore been known to effect a tool interference checking process by simulating an actual machining process according to a machining program on a display screen and checking the tool rests for their mutual interference. If an interference occurs in the tool interference checking process, then the program is altered or corrected manually by the operator. Therefore, the operator is required to think each time an interference happens, or always understand accurately, what part of the machining program is to be revised and how it is to be modified. Therefore, much labor and time have been needed in preparing a machining program.

SUMMARY OF THE INVENTION

It is an object of the present invention to provide a method of and an apparatus for preventing tool collision to avoid a tool interference in advance by automatically altering a machining program when tool rests interfere with each other during machining simulation on an animated display, through the utilization of a conventional tool interference checking process on an animated display.

According to the present invention, the conventional problems are solved by a method of preventing tool collision, including the steps of simulating and displaying the paths of movement of a plurality of movable members driven by respective independent programs in advance of an actual machining process, selecting the movable member to be moved first and the movable member to be stopped when an interference occurs, and correcting the programs to avoid the interference between the movable members by inserting a dwelling code into the programs.

With the method of the invention, in the event of an interference between tool rests during machining simulation on an animated display, machining programs are automatically altered in order to avoid such an interference. Therefore, labor and time required for the operator to alter the machining programs are reduced, and actual damage to tools which would otherwise result from the execution of the machining programs can be avoided.

BRIEF DESCRIPTION OF THE DRAWINGS

FIG. 2 is a schematic view of a four-axis lathe;

FIG. 3(a) is a diagram showing, by way of example, a machining program for a four-axis lathe;

FIG. 3(b) is a diagram showing an animated screen displaying paths of movement of two tool rests;

FIG. 4 is a view explaining an interference between tool rests in an actual machining process;

FIG. 5 is a diagram of system parameters required by an automatic collision prevention program;

FIGS. 7(a), 7(b), 7(c), and 7(d) are diagrams showing, by way of example, modifications of machining programs by using dwelling M codes; and FIG. 8 is a diagram showing an interference between tool rests in an actual machining process.

DESCRIPTION OF THE PREFERRED EMBODIMENT

An embodiment of the present invention will hereinafter be described in specific detail with reference to the drawings.

Figure 1:
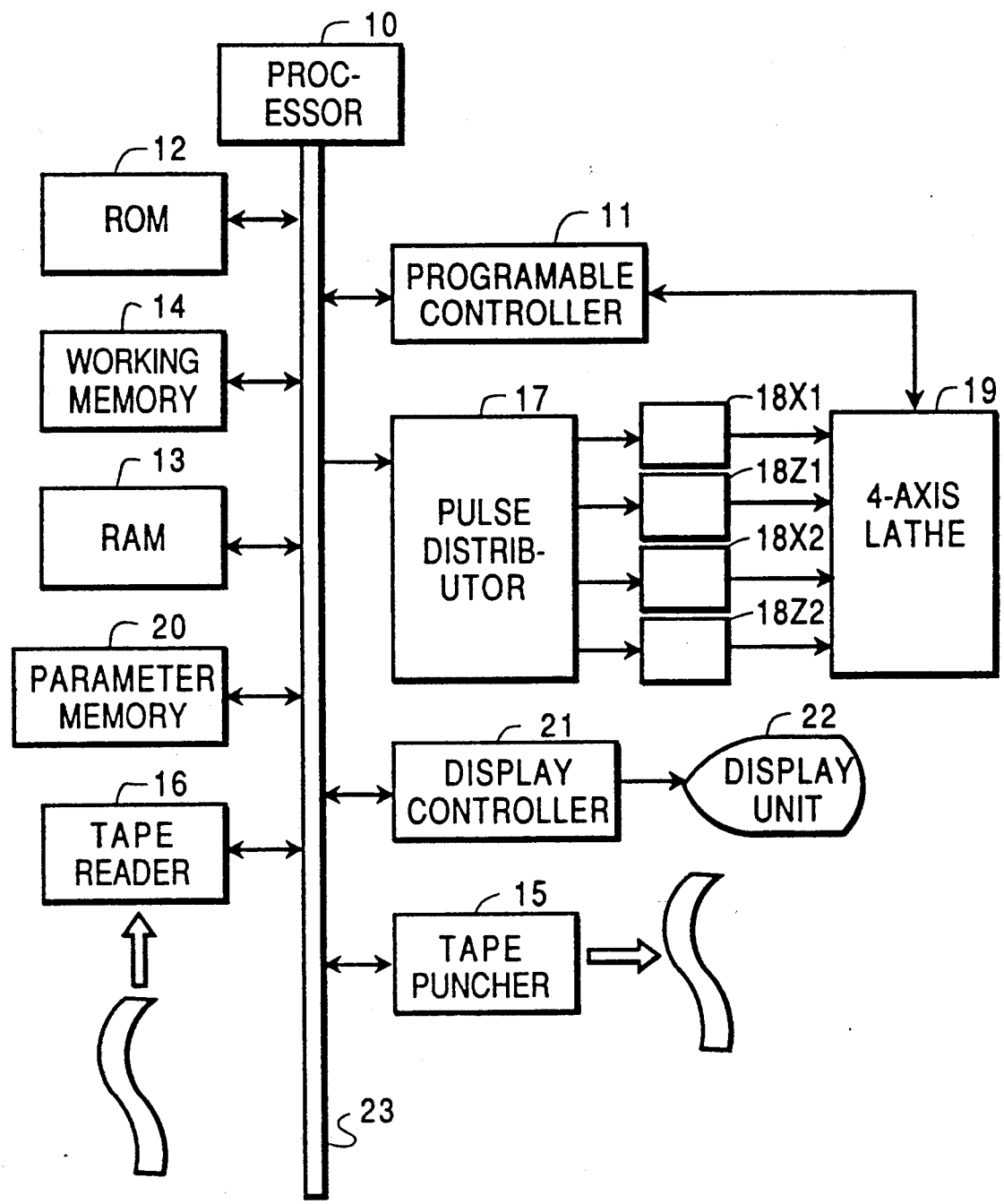
FIG. 1 is a block diagram of a system for carrying out a method of the present invention.

FIG. 1 is a block diagram showing, by way of example, a numerical control NC system for controlling a four-axis lathe.

Denoted in FIG. 1 at 10 is a processor for effecting numerical control by executing programs, 11 is a programmable controller for programmed execution of operation of an electric power circuit which carries out sequence control of a four-axis lathe, and 12 is a program memory storing various control programs to be executed by the processor 10. The memory 12 also stores an automatic collision prevention program for automatically altering machining programs according to the present invention. A data memory 13 stores data required for executing the programs for the processor 10 such as machining programs composed of data formats of numerical control commands. A working memory 14 serves to temporarily store the results of arithmetic operations effected by the processor 10. A paper tape puncher 15 records data on a paper tape by punching the same. A paper tape reader 16 reads numerical control commands (NC commands) punched in an NC tape. A pulse distributor 17 effects an arithmetic operation to distribute pulses according to a motion command from the processor 10 and issues distributed pulses commensurate with the commanded amount. Denoted at 18x1, 18z1, 18x2, and 18z2 are servo circuits for driving tool rests TP1 and TP2 in the directions of X- and Z-axes by controlling the X1 and Z1 axes and X2 and Z2 axes of a four-axis lathe 19. A parameter memory 20 stores system parameters required for executing the automatic collision prevention program. A display controller 21 has input keys for setting the system parameters and the like. A display unit 22 serves to display the paths of movement of the tool rests on an animated screen as shown in FIG. 3(b). An address data bus (hereinafter referred to as a "bus") 23 allows data to be transmitted between the processor 10 and the memories 12, 13, 14 and 20, and an input/output device.

The automatic collision prevention program stored in the program memory 12 will be described with reference to FIGS. 4 through 6.

During simulation of an actual machining process according to machining programs, and if an interference occurs (shown in FIG. 3) between the tool rests TP1 and TP2 (shown in FIG. 2) in a block N102 for the tool rest 1 and a block N202 for the tool rest 2, as shown in FIG. 4, the automatic collision prevention program automatically inserts dwelling M codes into prescribed positions in machining programs in order to move the tool rest of higher priority at first and temporarily stop the tool rest of lower priority. In order to start executing the automatic collision prevention program it is necessary for system parameters as shown in FIG. 5 to be preset.

The system parameters include a tool rest priority parameter, a dwelling M code parameter for stopping movement of a tool rest and determining the interval of stoppage of the tool rest, and a repetitive execution parameter for determining whether a machining program is to be repeatedly executed until no interference occurs. An initial value for the tool rest priority parameter is "0". If the tool rest priority parameter is "0", the operator can set it to "1" or "2" when an interference occurs between the tool rests during execution of the machining programs. When the priority parameter is "1", the tool rest 1 has higher priority, and when the priority parameter is "0", the tool rest 2 has higher priority. The stoppage interval of the dwelling M code parameter has an initial value of "200", and can be selected in the range of from "100" to "999". The repetitive execution parameter has an initial value of "0". When the repetitive execution parameter is "0", dwelling M codes are automatically inserted into prescribed positions in the machining programs, and then the machining programs are rewound to restart the machining programs from the beginning. When the repetitive execution parameter is "1", a dwelling M code is automatically inserted into prescribed positions in the machining programs, and then the machining programs are rewound to stop program execution.

Figure 6:
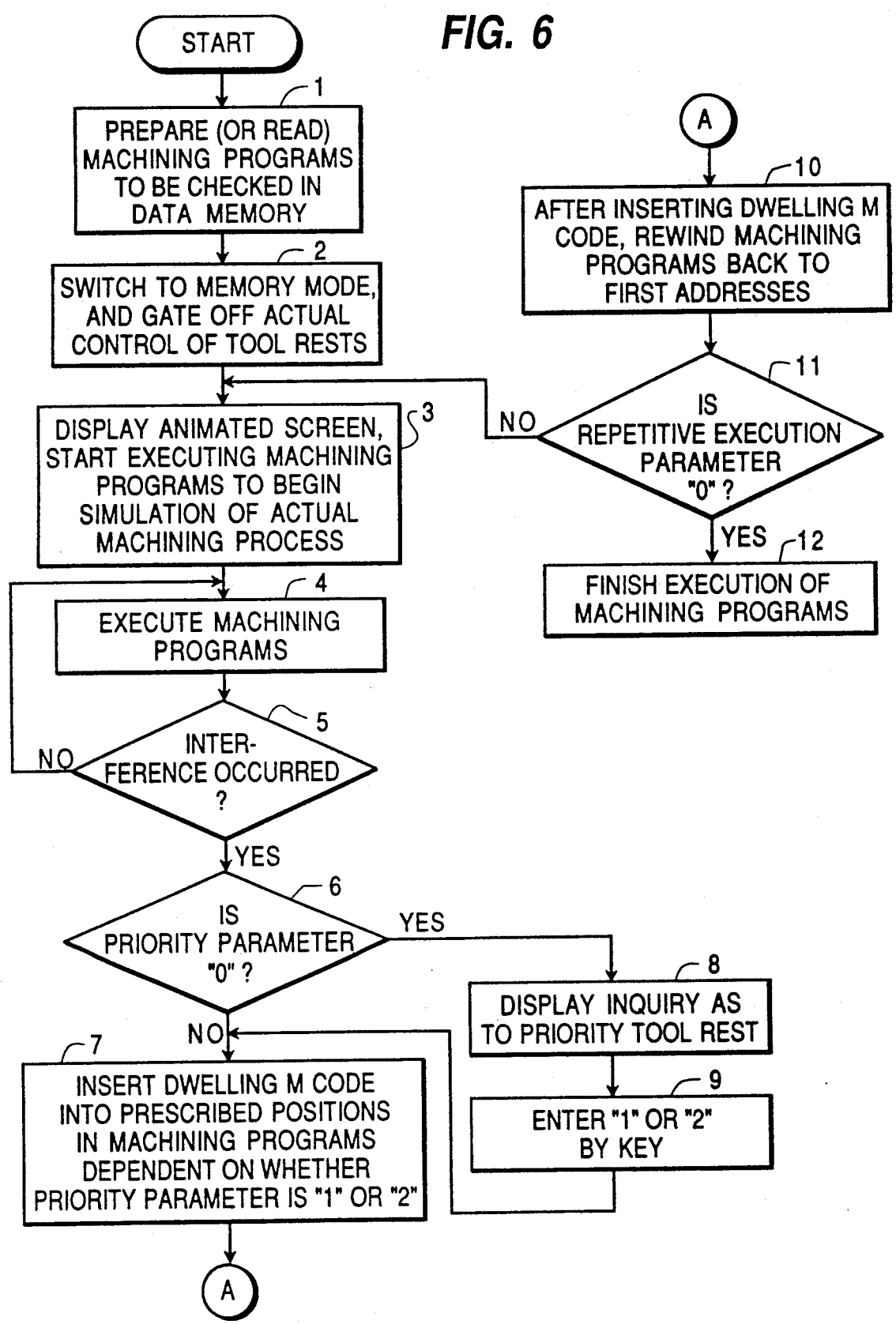
FIG. 6 is a flowchart of an operation sequence of the automatic collision prevention program.

If the above system parameters are properly established, the automatic collision prevention program will be executed according to the flowchart shown in FIG. 6.

Machining programs to be checked are prepared in the data memory 13 in step (1) by entering the machining programs through the tape reader 16, for example. Thereafter, in step (2) the four-axis lathe 19 is switched to a memory mode, i.e., a mode in which the programmable controller 11 and the pulse distributor 17 are disconnected from the bus 23 in FIG. 1, for data transfer only between the data memory 13 and the display controller 21. Then, an animated screen is displayed on the display unit 2, in step (3) and the machining programs are started from their first addresses to begin simulation of an actual machining process in step (4). The machining programs are successively executed block by block in step (4). Whether an interference has occurred between the tool rests is checked during the execution of the machining program in step (5). If no interference is caused, then control returns to step (4) and the machining programs are executed. If an interference is experienced, then control goes to step (6) which ascertains whether the priority parameter is "0" or not. If the priority parameter is not "0", then it is "1" or "2". Therefore, a dwelling M code is inserted into prescribed positions in the machining programs, as described in detail later on, dependent on the value of the priority parameter, in step (7). If the priority parameter is "0" in the step (6), then an inquiry as to a priority tool rest is displayed on the display unit in step (8). The operator then enters, in step (9) through a key, a tool rest priority parameter "1" or "2". Then control goes to step (7). After the dwelling M code has been inserted in step (7), the machining programs are rewound back to their first addresses in step 10. Whether the repetitive execution parameter is "0" or "1" is ascertained in step (11). If the respective execution parameter is "0", then the execution of the machining programs is completed in step (12). If the respective execution parameter is "1", control goes back to step (3) to execute the machining programs again.

Step (7) will be described in detail with reference to FIGS. 7(a) through 7(d).

In the event of an interference shown in FIG. 4 with the tool rest 1 having higher priority than the tool rest 2 (i.e., if the priority parameter is "1"), the automatic collision prevention program automatically inserts a dwelling M code M201 after the block N102 of the machining program for the tool rest 1 and before the block N202 of the machining program for the tool rest 2, as shown in FIG. 7(a). When the machining programs thus corrected are executed again, the tool rest 2 is stopped during a period specified by the dwelling M code M201 while the tool rest 1 is moving under a numerical control command of the block N102. Therefore, the tool rests are prevented from colliding with each other. The dwelling M code is inserted after the block N102 of the machining program for the tool rest 1 because synchronism should be kept between the block N103 of the machining program for the tool rest 1 and the block N202 of the machining program for the tool rest 2.

Conversely, when the tool rest 2 has higher priority than the tool rest 1, (i.e., when the priority parameter is "2"), a dwelling M code M201 is automatically inserted before the block N102 of the machining program for the tool rest 1 and after the block N202 of the machining program for the tool rest 2, as shown in FIG. 7(b).

Figures 7D, 8:
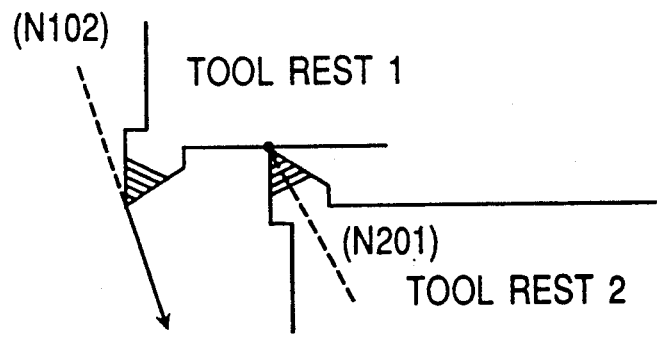

If a dwelling M code M201 is inserted when the priority parameter is "1" as shown in FIG. 7(a), and if, after the machining programs are executed from their first addresses, there is an interference occurring in the block N103 of the machining program for the tool rest 1 and the block N202 of the machining program for the tool rest 2, then, as shown in FIG. 7(c), a dwelling M code having a different period than that of the dwelling M code N201, e.g., a dwelling M code M202, is inserted after the block N103 and before the block N202, and the dwelling M code M201 is deleted. With this modification, while the blocks N102, N103 are being executed, the tool rest 1 is stopped during the period specified by the different dwelling M code M202 for avoiding collision between the tool rests.

Where a dwelling M code M201 is inserted when the priority parameter is "1" and the machining programs are executed again from their first addresses, if an interference occurs between the tool rest 2 stopped after the execution of the block N201 and the tool rest 1 moved by the execution of the block N102, as shown in FIG. 8, then the inserted dwelling M code M201 is deleted, and a dwelling M code having a different period than that of the dwelling M code M201, e.g., a dwelling M code M202, is inserted after the block N102 and before the block N201. While the tool rest 1 is moving according to the blocks N101 and N102, the tool rest 2 is stopped in its initial position and hence prevented from interfering with the tool rest 1.

Therefore, the automatic collision prevention program can automatically prepare a machining program which is free from the danger of interference during an actual machining process by automatically inserting a dwelling M code into prescribed positions in machining programs, through the use of a tool interference checking process utilizing an animated screen.

The present invention is also effective in preparing a machining program which prevents collision between movable members of a general NC machine tool in addition to a four-axis lathe as described above. Many changes and modifications may be made in the present invention without departing from the scope of thereof.

According to the present invention, as described above, the paths of movement of movable members such as a plurality of tool rests are displayed on an animated screen for simulating an actual machining process and checking the tool rests for their mutual interference. If an interference occurs on the screen, then the machining programs are automatically altered to avoid any interference in the actual machining process. Therefore, the machining programs can be rewritten with utmost ease, and tools can reliably be prevented from damage.

We claim:

1. A method of preventing tool collision in a numerically controlled machine tool having a plurality of moveable members controlled by respective independent programs, said method comprising the steps of:
   (a) simulating and displaying the paths of movement of the plurality of moveable members in advance of an actual machining process;
   (b) detecting, using the independent programs, an interference between the paths of movement of the plurality of moveable members;
   (c) selecting one of the plurality of movable members to be moved and one of the plurality of movable members to be stopped when an interference is detected in accordance with a priority parameter given to each of the movable members, the priority parameter being initially established or established when an interference is detected; and
   (d) continuously correcting the respective programs to avoid the interference between the movable members by automatically inserting a new dwelling code, having a predetermined stoppage interval different from that of an original dwelling code, into the programs while viewing a display screen in accordance with the priority parameter until the interference is removed.

2. A method according to claim 1, wherein in said step (c) a period of time in which the movable member is temporarily stopped is specified by said dwelling code.

3. A method of preventing tool collision in a numerically controlled machine tool including a plurality of tools having a plurality of moveable members controlled by respective programs, said method comprising the steps of:
   (a) entering machining programs, through means for entering, into a memory;
   (b) switching a multi-axis lathe to a memory mode for transferring data between the memory and a controller;
   (c) displaying on a display unit the machining programs;
   (d) simulating the actual machining process of the machining programs on the display unit;
   (e) checking the simulated actual machining process to determine whether an interference between tool means has occurred during the machining programs;
   (f) executing the actual machining programs if interference is not detected;
   (g) determining a priority parameter which automatically determines priority between tool means if interference is detected in the simulated actual machining process; and
   (h) automatically inserting a new dwelling code, having a different period than that of an original dwelling code, into prescribed positions in the machining programs, while viewing the display, in accordance with the priority parameters to remove the interference.

4. A method according to claim 3, further comprising the step of continuously inserting codes into prescribed positions in the machining programs until interference of the tool no longer exists.

* * * * *

UNITED STATES PATENT AND TRADEMARK OFFICE
CERTIFICATE OF CORRECTION

PATENT NO.  : 5,079,713
DATED       : JANUARY 7, 1992
INVENTOR(S) : HIDEAKI KAWAMURA ET AL.

It is certified that error appears in the above-identified patent and that said Letters Patent is hereby corrected as shown below:

TITLE PAGE [54] "COLLISON" should be --COLLISION--.

Col. 1, line 2, (in the title) "COLLISON" should be --COLLISION--.
      line 23, "multi-axis" should be --multi-axis lathe--.

Col. 4, line 5, " "0" " should be --"2"--.

Col. 5, line 27, "N201" should be --M201--.

Col. 6, line 2, "relially" should be --reliably--.

Signed and Sealed this

Eighth Day of June, 1993

Attest:

MICHAEL K. KIRK

*Attesting Officer*      Acting Commissioner of Patents and Trademarks